United States Patent [19]

Anderson, Jr. et al.

[11] 3,826,544

[45] July 30, 1974

[54] TRUNNION MOUNTED MARINE THRUST BEARING/VIBRATION REDUCER

[75] Inventors: Hugh G. Anderson, Jr., Lanham; Jai R. N. Rajan, Bowie, both of Md.; Wade H. Morse, Portsmouth, R.I.

[73] Assignee: The United States of America as represented by the Secretary of the Navy, Washington, D.C.

[22] Filed: May 4, 1973

[21] Appl. No.: 357,296

[52] U.S. Cl. ............................................. 308/160
[51] Int. Cl. ........................................... F16c 17/04
[58] Field of Search ...................... 308/9, 160, 168

[56] References Cited
UNITED STATES PATENTS

| 2,986,431 | 5/1961 | Block et al. | 308/9 |
| 3,189,389 | 6/1965 | Herr | 308/9 |
| 3,368,851 | 2/1968 | Eggmann | 308/9 |
| 3,649,089 | 3/1972 | Bouvier | 308/9 |

FOREIGN PATENTS OR APPLICATIONS

| 626,978 | 1/1963 | Belgium | 308/160 |

Primary Examiner—Charles J. Myhre
Assistant Examiner—Frank Susko
Attorney, Agent, or Firm—R. S. Sciascia; Q. E. Hodges

[57] ABSTRACT

The instant invention is a marine bearing device which compensates for a shaft misalignment. No housing is necessary for the bearing since the flanges of the shaft are used as bearing surfaces and partial enclosures of the bearing apparatus. This saves space and eliminates the need for traditionally used hardware. Two concepts are melded to become substance of the instant invention and provide an exceptionally efficient vibration reducing thrust bearing. First is the concept of using two shaft flanges as thrust collars so that both forward and aft thrust bearings can be serviced and mounted on a single and compact vibration reducer housing. The use of the single vibration reducer housing facilitates the use of the second concept which is that of permitting the entire bearing to rotate freely about an axis perpendicular to the shaft by trunnion mounting the vibration reducer.

7 Claims, 5 Drawing Figures

TRUNNION MOUNTED MARINE THRUST BEARING/VIBRATION REDUCER

The invention described herein may be manufactured by or for the Government of the United States of America for governmental purposes without the payment of any royalties thereon or therefor.

BACKGROUND OF THE INVENTION

This invention relates to vibration reducing marine thrust bearing used with large capacity marine propeller shafts.

Virtually all large marine surface craft and most submarine craft employ the hydrodynamic or "Kingsbury" pivoted pad type bearing to transmit forward or aft thrust loads from the shaft to the thrust bearing housing and ultimately to the vessel structure. In some of these bearings, the forward thrust is directed through individual hydraulically loaded pistons placed between each of the pads and the bearing housing. Propeller induced axial vibrations are reduced by the damping properties and slight compressibility of the oil in the hydraulic system. The pistons and the shaft positioning system is called a vibration reducer. The "Kingsbury" bearing includes a large housing surrounding the shaft and thrust collar attached to the shaft with forward and aft bearing pads on opposite sides of the thrust collar and within the bearing housing. The aft bearing pads are typically supported by spring mechanisms while the forward bearing pads are typically supported by vibration reducer hydraulic pistons. This configuration requires an inordinate amount of valuable engine room space and requires a large bearing housing which must not only cover and support the elements but must be able to withstand and transmit the large loads produced by the propeller and shaft system.

Another example of a prior art device is the self-aligning roller thrust bearings which are used in various other Naval applications. Motion due to shaft misalignment in such applications is often taken up through the use of spherical roller bearings. Theoretically, the spherical roller bearings concept could be applied to large marine propulsion thrust bearings. However, experiments in this approach demonstrate that the concept is unusable since the service life of a spherical roller bearing design is undesirably short.

The prior art "Kingsbury" type bearing is shown in FIG. 1 wherein like numerals designate the same element. The propeller shaft 1 including the thrust collar 23 is supported by radial bearing 29. The thrust collar 23 is surrounded by bearing housing 24. The thrust collar 23 engages either forward bearing pads 25 which in turn engage vibration reducer piston 26 or, alternatively, engages aft bearing pads 27 which reduces vibration and transmits thrust through the action of spring 28. Either forward or aft thrust is transmitted through housing 24 to vessel structure 18.

The inability of the "Kingsbury" type bearing to compensate for more than slight misalignment is obvious from its configuration as shown in FIG. 1. With a "Kingsbury" configuration high starting torques are necessary to overcome the static friction between the bearing pads and the thrust collar. Although "Kingsbury" type thrust bearings perform satisfactorily, roller bearings, such as those incorporated into the bearing of the instant invention, have a size and weight advantage as well as significantly lower starting torque characteristics. These features are particularly important for submarine where spacial considerations are paramount and high thrust must be absorbed.

SUMMARY OF THE INVENTION

The general purpose of this invention is to provide a vibration reducing thrust bearing which requires very low starting torque and takes a minimum amount of space. This vibration thrust bearing uses the advantages of roller bearing in a vibration reducer system while avoiding the problems of galling and piston seal wear. In the prior art, galling was the inevitable result of the use of roller bearings in a vibration reducer bearing. Further, the integration of the roller bearing within the vibration reducer bearing system, unlike the "Kingsbury" configuration, make the reliability of the bearing predictable.

To attain the above described desirable characteristics, the present invention is a trunnion mounted marine thrust bearing vibration reducing combination with an integral radial bearing and fore and aft roller thrust bearing. The vibration reducing and bearing components are confined between two shaft flanges thereby negating the necessity of a large bearing housing. Further, the shaft flange are engaged directly by the fore and aft bearings and thereby act as runners or thrust collars.

OBJECTS OF THE INVENTION

An object of the invention is to provide a vibration reducer marine thrust bearing with integral roller bearings.

An object of the invention is to eliminate the need for a large bearing housing in a vibration reducer marine thrust bearing.

Another object of the invention is to provide a vibration reducer marine thrust bearing with fewer parts than the prior art.

Another object of the invention is to provide a vibration reducer marine thrust bearing with an enhanced capacity to withstand misalignment.

Another object of the invention is to provide a space saving marine thrust bearing which is economical to manufacture and maintain.

Another object of the invention is to provide a vibration reducer marine thrust bearing with low starting torque.

DESCRIPTION OF THE PREFERRED EMBODIMENT

Figure 1:
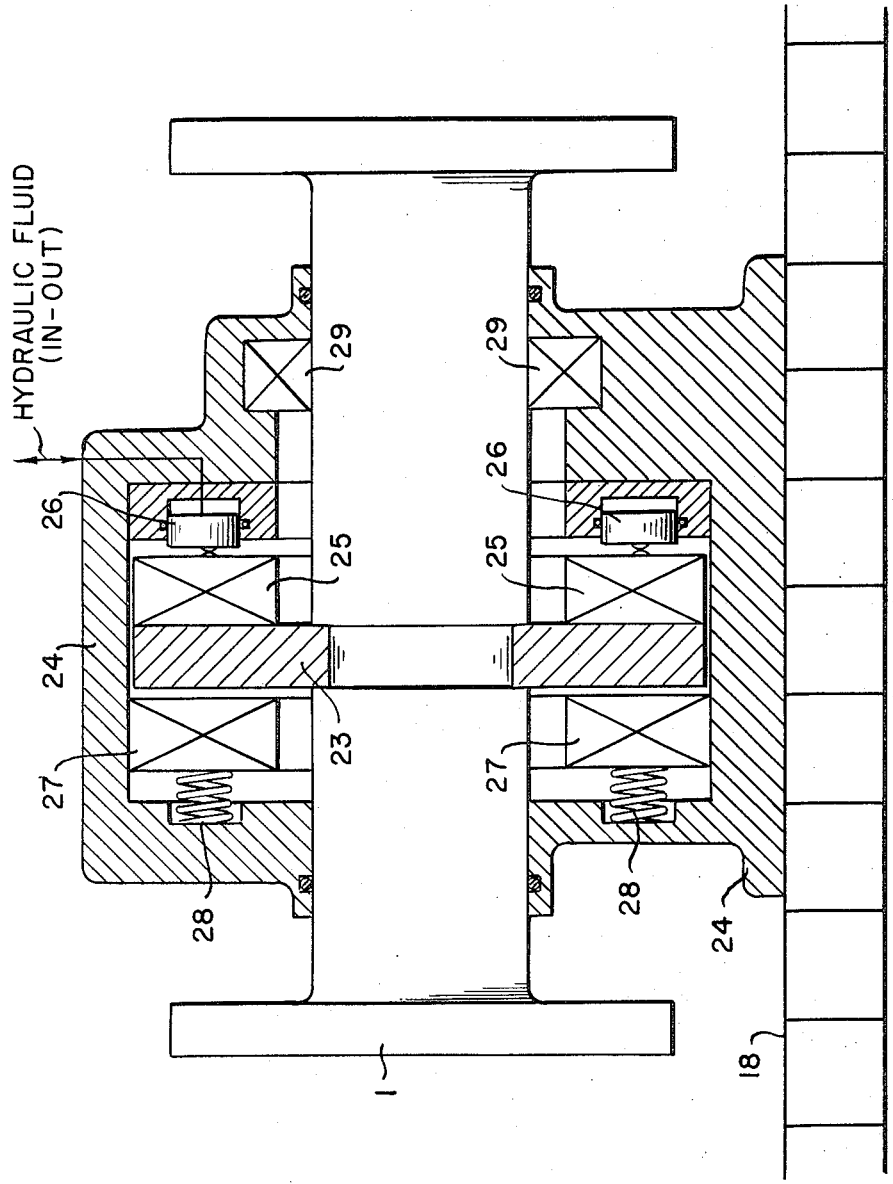
FIG. 1 is a cross section view of the prior art vibration reducer "Kingsbury" bearing.
Figure 2B:
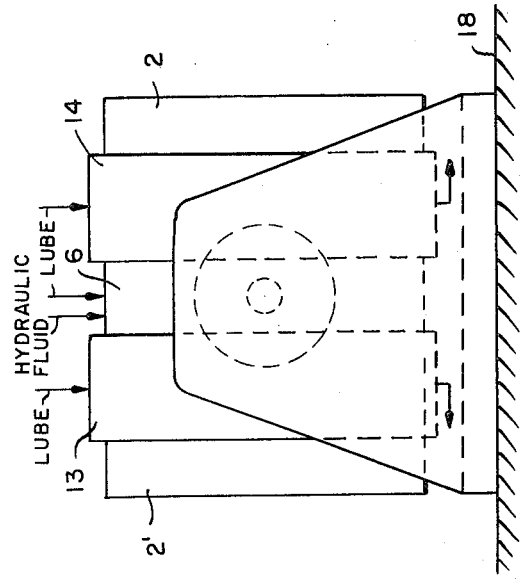
FIG. 2b is a side view of a schematic of a vibration reducer bearing embodying the invention.
Figure 2A:
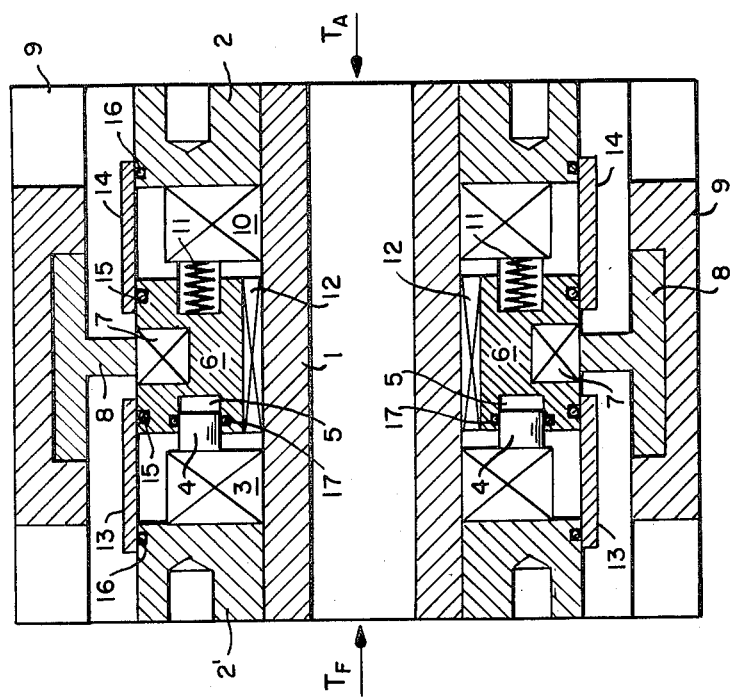
FIG. 2a is a cross sectional view of a schematic of a vibration reducer bearing embodying this invention.

Referring in detail to the drawings, FIG. 2 illustrates the schematic of a trunnion mounted marine thrust bearing vibration reducer. A large thrust marine shaft 1 has flanges 2 and 2'. Flange 2' is engaged by forward thrust roller bearing 3 which in turn engages vibration reducer pistons 4 which is supported by vibration reducer housing 6 which contains hydraulic fluid cavities 5. The vibration reducer housing 6 is supported by trunnion arms 8 and trunnion bearings 7. Shaft flange 2 engages aft thrust bearing 10 which engages vibration reducer springs 11 which allow for slight misalignment in the shaft. The shaft is supported by radial bearing 12 which, in this schematic, engages housing 6 so it too is ultimately supported by trunnion arm 8. Seal 17 provides a seal between vibration reducer piston 4 and the hydraulic fluid cavity 5. Forward thrust bearing housing cover 13 extends between vibration reducer housing 6 and shaft flange 2'. Aft bearing cover 14 extends between shaft flange 2 and vibration reducer housing six. Static seals 15 provide a fluid seal between the housing cover and vibration reducer housing 6. Dynamic seals 16 provide fluid type seals between the housing cover and flanges 2 and 2'. Trunnion arms 8 are mounted on the trunnion base 9 which is supported by deck 18. The mechanism between the flanges and the trunnion which receives and transmits the thrust is the thrust receiving means. The vibration reducing means is made up of the springs, pistons and hydraulic system, etc.

Forward thrust is transmitted from flange 2' through forward thrust bearing 3 to vibration reducer piston 4 then to the hydraulic fluid cavity 5 and subsequently to housing 6. The thrust is then transmitted from housing 6 to trunnion bearings 7 and trunnion arm 8 to the trunnion base 9 which is connected to deck 18. The aft thrust is transmitted from flange 2 to the aft thrust bearing 10 to springs 11 and then to housing 6. The thrust is transmitted to the deck as before. The entire thrust bearing vibration reducer is supported vertically by trunnion bearing 7 trunnion arm 8 and trunnion base 9.

Lubrication for the forward thrust bearing 3 enters the top of the housing cover 13 and leaves through the bottom. Lubrication for the aft thrust bearing 10 enters through the top of the housing cover 14 and leaves through the bottom. Lubrication for the radial bearing 12 enters through the top of the housing 6 and leaves through the bottom. Hydraulic fluid for the vibration reducer pistons 4 enters and leaves the hydraulic fluid cavity 5 through housing 6.

Figure 3:
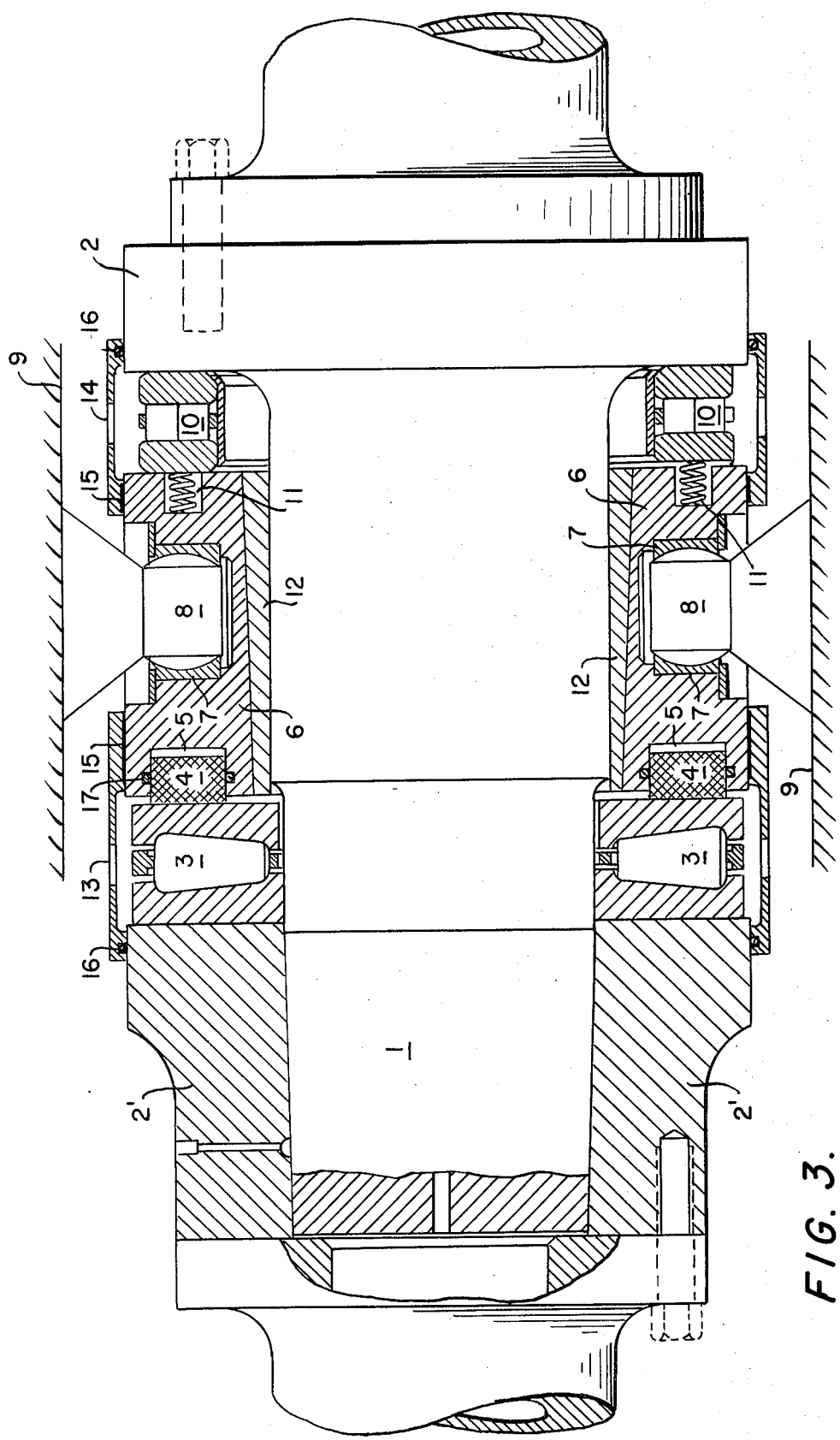
FIG. 3 is a cross sectional view of an operational vibration reducer thrust bearing embodying this invention.

Since radial bearing 12 will always maintain the shaft in the housing 6 perpendicular to one another, shaft misalignment in the vertical plane is compensated for between the housing 6 and the foundations of the trunnion base 9. The entire trunnion consists of the base 9, arms 8 and bearings 7. Thus during misalignment the shaft 1 and the housing 6 rotate around the axis of the trunnion arm 8 essentially as a rigid body. Smaller amounts of misalignment in the non-vertical planes are taken up through the contacting interfaces and deformation of the trunnion arms 8. This invention expedites the servicing of such a bearing since the removal of the forward thrust bearing 3 requires only the taking off of housing cover 13 and shaft flange 2'. Once the forward bearing 3 is removed, the vibration reducer pistons 4 are accessible for removal and inspection. The aft thrust system can be removed by either taking off the housing cover 14 and the shaft flange 2 or by pulling the shaft 1 with the aft bearing thrust flange 2 from the housing as a unit. Using the latter method, the shaft 1 and the aft thrust flange 2 can be manufactured as a single component. The radial bearing 12 can be removed once the shaft 1 is taken out of the housing 6. FIG. 3 partly illustrates the marine thrust bearing vibration reducer detailed design based upon this invention. The principal parts are the shaft 1 with the afixed thrust flange 2 and 2', and tapered roller forward thrust bearing 3 engaging vibration reducer pistons 4. As in FIG. 2, the vibration reducer piston engages the hull hydraulic fluid cavity 5 and housing 6 which in turn transmits the thrust through the trunnion ball bushing 7 to the tapered trunnion arm 8 then to the trunnion in base 9. The cylindrical roller aft thrust bearing 10 engages vibration reducers springs 11. A removable radial bearing 12 acts as before. As in FIG. 2a, the forward thrust housing cover 13 and the aft thrust bearing of the cover 14 engage housing 6 and the respective flanges. The bearing is designed to handle large thrust loads at low speeds and to tolerate severe misalignment.

Severe misalignment typically occurs in submarines. Such misalignment is unavoidable since the bearing must be mounted either directly or indirectly to the pressure hull of the submarine. When the submarine descends to operational depth the great hydrostatic pressure on the submarine hull will cause the pressure hull to displace. This displacement cuases the bearing itself to displace and thus the coordinate severe misalignment of the shaft occurs. This invention overcomes the unavoidable drawback of galling and wear due to bearing displacement and shaft misalignment.

Figure 4:
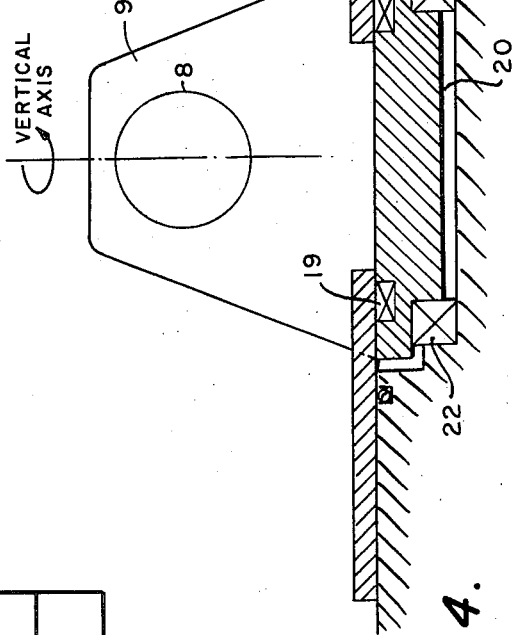
FIG. 4 is a side view of a trunnion base which allows shaft misalignment about the vertical axis through the bearing when used in conjunction with the bearings of FIGS. 2 or 3.

FIG. 4 is a side view of a further modification of this invention. Shaft misalignment due to the displacement of a submarine pressure hull upon pressurization is substantially in the vertical direction. However, substantial horizontal displacement may be a problem in a submarine or other marine shaft operation. FIG. 4 is a view of a trunnion mounting which, when used in the bearing of this invention, eliminates galling due to horizontal misalignment. In the figure, the trunnion arm 8 is mounted on trunnion base 9 which in turn is fixed to element 20 which engages bearings 19 and 22. This configuration provides compensation for movement about the horizontal axis.

This invention provides vibration reducer marine thrust bearing which is smaller in size and weight than existing bearings and eliminates piston cocking in the vibration reducer system. It also has the capacity to withstand any desired amount of vertical plane shaft misalignment.

Obviously, many modifications and variations of the present invention are possible in the light of the above teachings. It is therefore to be understood that within the scope of the appended claims, invention may be practiced, otherwise, than as specifically described.

What is claimed is:

1. In a large capacity marine vibration reducing thrust bearing, the combination comprising:
   a shaft;
   a first flange attached to said shaft;
   a second flange spaced apart from said first flange and attached to said shaft;
   a forward thrust bearing positioned in contact with said first flange in the space between said first and said second flange;

a multiplicity of vibration reducer pistons in contact with said thrust bearing in said space between said first and said second flange;

a vibration reducer housing located in the space between said first and said second flange;

a multiplicity of hydraulic fluid containing cavities in said vibration reducer housing adjacent said vibration reducer pistons opposite said forward thrust bearing;

an aft thrust bearing in contact with said second flange;

a multiplicity of spring biased bearing pads attached to said vibration reducer housing and in contact with said aft thrust bearing;

a set of trunnion bearings mounted on each side of said vibration reducer housing;

a trunnion arm engaging said trunnion bearing; and a trunnion base fixedly attached to said trunnion arm.

2. A combination as in claim 1, wherein:
said first flange is removable from said shaft.

3. A combination as in claim 1, wherein:
said second flange is removable from said shaft.

4. A combination as in claim 1, wherein:
said trunnion base is mounted for movement about the vertical axis.

5. In a large capacity marine vibration reducing thrust bearing, the combination comprising:
a shaft;
a first flange attached to said shaft;
a second flange spaced apart from said first flange and attached to said shaft;
a trunnion;
a trunion base;
a means for internally reducing vibration affixed to said trunion between said first and second flange.

6. A combination as in claim 5, wherein:
said trunnion base is mounted for movement about the vertical axis.

7. In a large capacity marine vibration reducing thrust bearing used on a drive shaft, the combination comprising:
a first shaft flange;
a second shaft flange spaced apart from said first flange;
a forward thrust bearing positioned in contact with said first flange in the space between said first and said second flange;
a multiplicity of vibration reducer pistons in contact with said thrust bearing in said space between said first and second flange;
a vibration reducer housing located in the space between said first and said second flange;
a multiplicity of hydraulic fluid containing cavities in said vibration reducer housing adjacent said vibration reducer pistons opposite said forward thrust bearing;
an aft thrust bearing in contact with said second flange;
a multiplicity of spring biased bearing pads attached to said vibration reducer housing and in contact with said aft thrust bearing; and,
a means attached to said vibration reducer housing which permits universal movement of said vibration reducing thrust bearing.

* * * * *